United States Patent [19]

Dollar et al.

[11] Patent Number: 5,479,891
[45] Date of Patent: Jan. 2, 1996

[54] POULTRY FEED RESTRAINT

[76] Inventors: Travis Dollar; Jenny L. Dollar, both of HC 69, Box 60, Pine Ridge, Ark. 71961

[21] Appl. No.: 300,078

[22] Filed: Sep. 2, 1994

[51] Int. Cl.$^6$ .................................................. A01K 37/00
[52] U.S. Cl. ............................................................. 119/715
[58] Field of Search ....................................... 119/712, 713, 119/714, 715, 174

[56] References Cited

U.S. PATENT DOCUMENTS

| | | | |
|---|---|---|---|
| D. 136,342 | 9/1943 | Eisen | 119/715 X |
| 546,905 | 9/1895 | Schild. | |
| 1,962,395 | 6/1934 | Jones | 119/97 |
| 2,286,001 | 6/1942 | Nichols et al. | 119/97 |
| 2,398,316 | 4/1946 | Litton | 119/97 |
| 2,718,213 | 9/1955 | Bartner | 119/715 |
| 3,066,651 | 12/1962 | Harwood et al. | 119/715 |
| 3,212,475 | 10/1965 | Harwood et al. | 119/715 |
| 3,807,360 | 4/1974 | Keene | 119/97 |

*Primary Examiner*—Thomas Price

*Attorney, Agent, or Firm*—Stephen D. Carver; Trent C. Keisling

[57] ABSTRACT

A poultry feed restraint is disclosed and is adapted to control the eating habits of a selected bird. The restraint comprises an elongated, resilient body that penetrates the beak of the bird. The restraint is inserted through the bird's nostrils or nares to a midpoint. Then the restraint is rotated from the insertion position to a deployed position. A pair of opposing ramps rest upon the exterior of the beak to secure the restraint. A groove defined between the ramps facilitates the rotary movement of the restraint. The restraint prevents the bird from inserting its head into a feeder equipped with a guard or grill. The restraint may be used as part of a system to effectively control the consumption of feed by selected birds. In the system, a feeder with a grill disposed over its top is used. The grill has a predetermined access gap between its bars so that the unselected birds may eat freely from it. The selected birds are prevented from taking food from the feeder because their restraint prevents them from inserting their heads through the access gap. The restraint is not dependent upon the size of the head of the selected bird. Thus, any bird can be selectively fitted with the restraint to prevent its overeating.

14 Claims, 2 Drawing Sheets

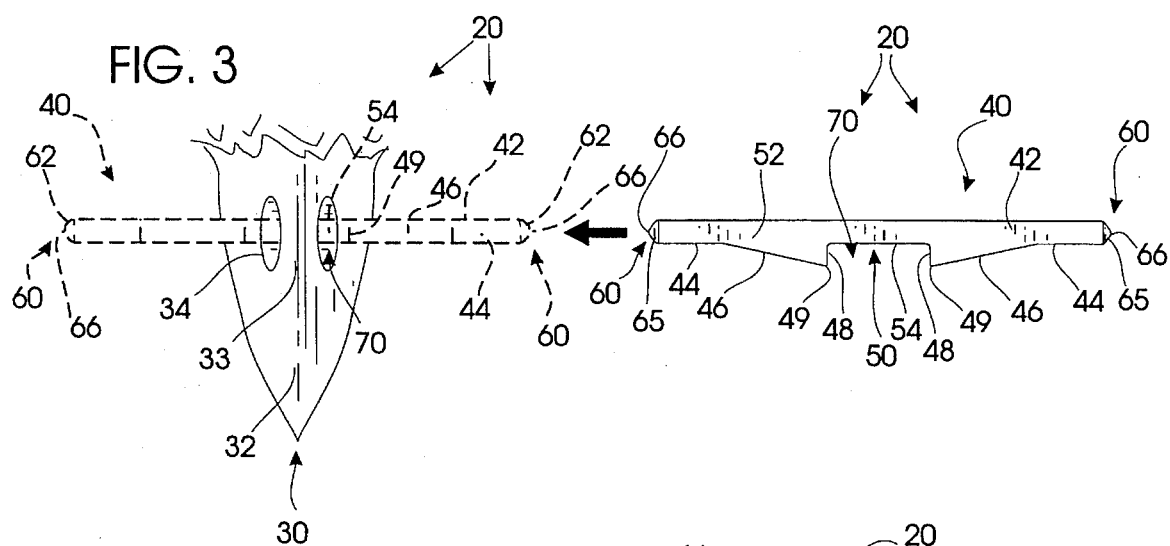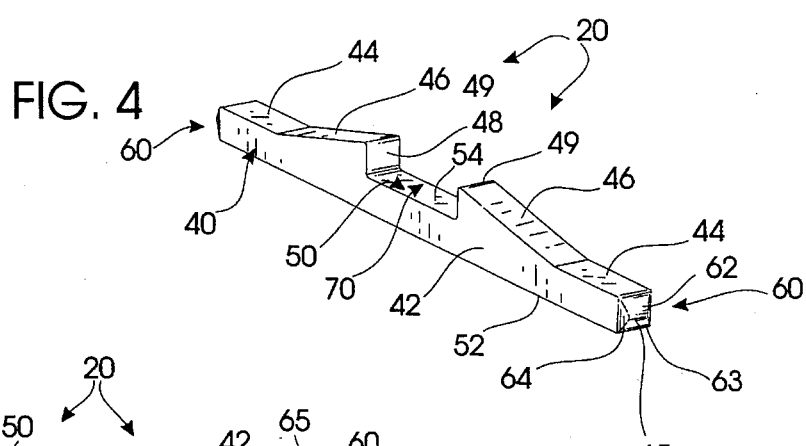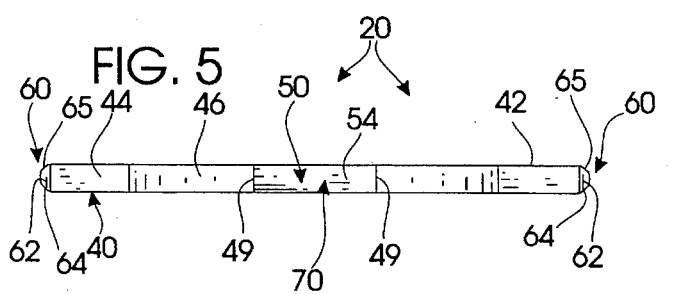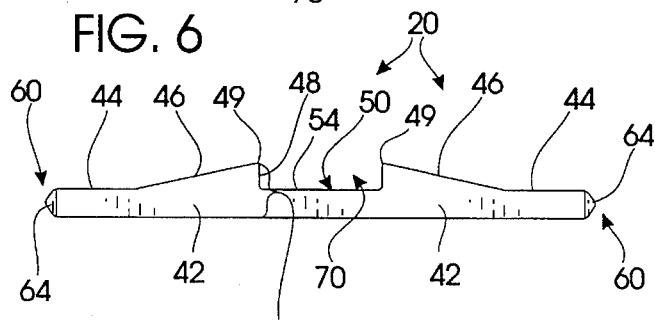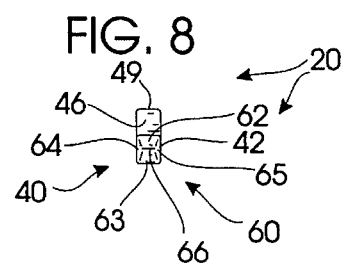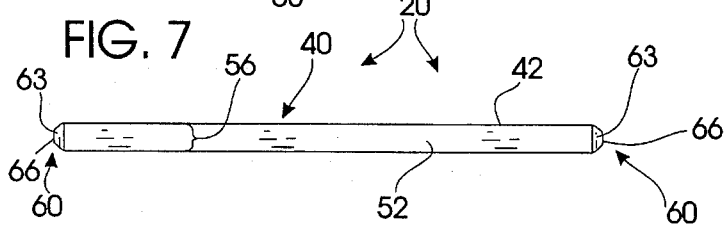

POULTRY FEED RESTRAINT

BACKGROUND OF THE INVENTION

I. Field of the Invention

The present invention relates generally to poultry feeders and accessories. More particularly, the present invention relates to a poultry feeder restraint that is inserted into a bird's beak to prevent the bird from overeating. Known relevant prior art devices are classified in U.S. Class 119, subclasses 97, 713 and 175.

II. Description of the Prior Art

In conventional poultry laying operations, male birds or roosters represent between ten to twenty percent of the total population of the flock in a particular house. This range is required to ensure: that all prospective females or hens are properly fertilized. However, the lower the rooster population, the more females or hens the house can contain and support. As long as the roosters fertilize the hens adequately, more hens means more production. Therefore, it is desirable to lower the percentage of roosters without decreasing the fertilization rate for the hens.

As will be recognized by those in the art, lean, agile, energetic roosters are highly active sexually. Roosters of this type are desirable. Overweight, lethargic, uncoordinated roosters are sexually inactive. Roosters of this type are undesirable.

Lethargic roosters often fail to adequately fertilize the hens. Therefore, more obese roosters are required than active, energetic roosters to fertilize the same number of hens. More roosters require more feed and maintenance.

Obese roosters are also more prone to injury. Often, obese roosters will break a leg or injure a hen because of their condition.

In order to prevent rooster obesity, the roosters are normally fed a restricted diet to control their weight. However, the females or hens must be generously fed to stimulate egg production and weight gain. To achieve peak production, food must always be available to the hens. But, since the roosters are bigger and stronger than the hens, the roosters often overpower the hens and steal their food. Several methods of preventing this theft have been tried in the industry.

Prior art devices have attempted to control rooster diets by narrowing the access spaces on the guards or grills surrounding typical chicken feeders. These devices prevent overeating by providing a feeder gap that is too small for a male bird to stick his head through. These devices only function properly when the male head is of a significantly larger size than the female head to prevent his access to the feed. A seperate feeder provides the male feed supply.

Several devices that are not specifically designed to prevent rooster overeating are also known to applicant. The devices disclosed in U.S. Pat. Nos. 3,807,360, 546,905 2,398,316, 3,066,651, 2,286,001 and 1,962,395 teach ways for preventing a bird from picking at another bird. Thus, the known prior art fails to provide an effective device for preventing overeating by selected birds.

SUMMARY OF THE INVENTION

We have designed a poultry feed restraint that is adapted to control the eating habits of a selected bird. The restraint comprises an elongated, resilient body that penetrates the beak of a selected bird. The restraint is inserted into the bird's nostrils or nares and through the beak to a midpoint. The restraint is then rotated from this inserted position to a deployed or employed position where it facilitates the controlled eating of the bird.

A pair of opposing ramps define a recessed notch or channel. The recessed notch seats inside the bird's nares to prevent the removal of the restraint. The restraint prevents the bird from inserting its head into a feeder equipped with a grill having a predetermined gap.

The restraint may be used as part of a system to effectively control the eating of selected birds. In the system, the feeder has a grill disposed over its top. The grill has a gap of approximately one and five-eighths inches to one and three-quarter inches between the bars so that the unselected birds may eat freely from it. However, the selected birds are prevented from taking food from the feeder because the restraint prevents them from inserting their heads through the gap.

The restraint is not dependent upon the size of the bird's head. In other words, the restraint will function properly on any bird. Thus, any bird could be selectively fitted with the restraint to prevent its overeating.

Thus a primary object of the present invention is to provide a simple and effective poultry feed restraint that controls the amount of food a selected bird consumes.

Another basic object of the present invention it to provide a system that controls the amount of food a selected bird consumes while allowing other birds to eat freely.

A related object of the present invention is to provide a simple device for controlling poultry weight gains.

Another object of the present invention is to prevent overeating by poultry.

A basic object of the present invention is to prevent injury to poultry.

Another basic object of the present invention is to provide a feed restraint that is easily inserted into a birds beak.

Another object of the present invention it to provide a device that automatically controls the eating habits of poultry.

A related object of the present invention is to provide a dependable restraint that may be secured to a bird in a biasing fashion.

A basic object of the present invention is to maximize the male to female bird ratio in a manner that ensures the fertilization of substantially all of the female birds.

A related object of the present invention is to maximize the production of a poultry operation.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views:

FIG. 3 is a greatly enlarged, pictorial view showing the restraint in an insertion position, with the shaded lines depicting the rotation of the restraint into a deployed position;

FIG. 4 is an isometric view of the restraint shown in FIG. 1;

FIG. 5 is a top plan view thereof;

FIG. 6 is a front elevational view thereof, the rear side being a mirror image thereof;

FIG. 7 is a bottom plan view thereof; and

FIG. 8 is an end view thereof, the opposite end being a mirror image thereof.

DETAILED DESCRIPTION

Figure 1:
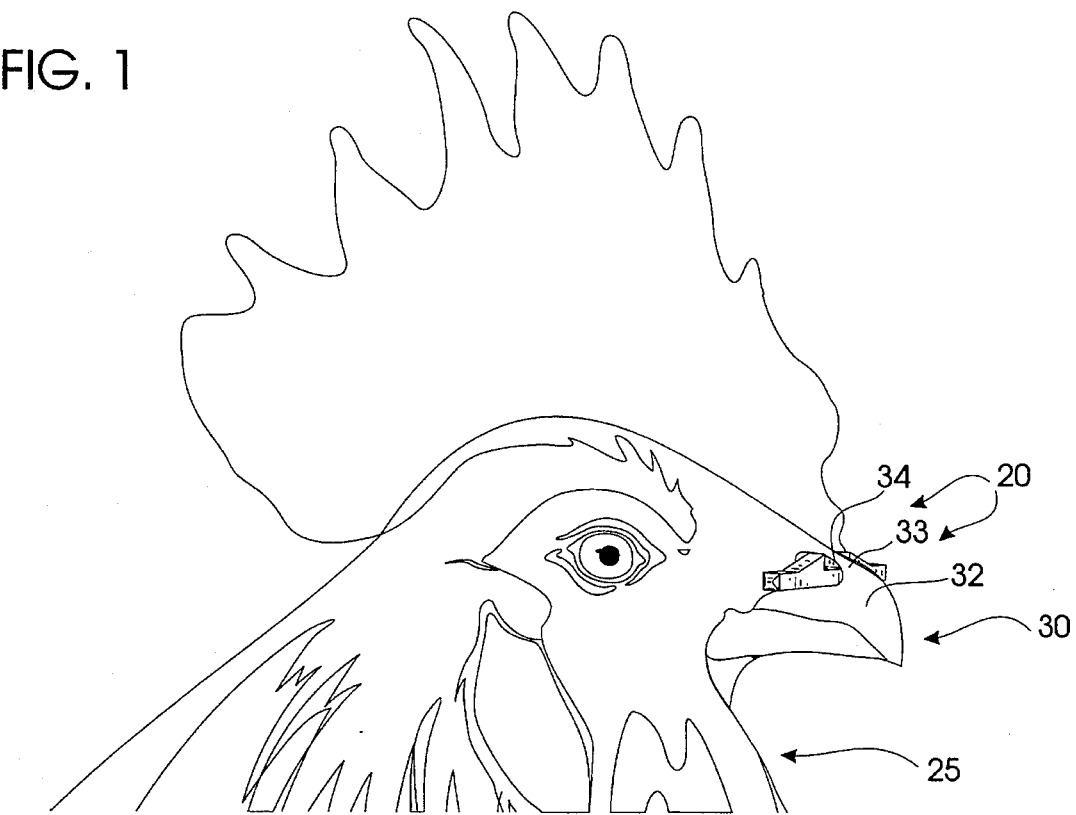
FIG. 1 is a pictorial view showing the best mode of my poultry feed restraint deployed in a bird.

Referring more specifically to the drawings, my poultry feed restraint is generally referred to by reference numeral 20. As can be seen in FIG. 1, my poultry feed restraint 20 attaches to the beak 30 of a selected bird 25. The restraint 20 is inserted into the nostrils or nares 34, penetrating the upper beak 32 (FIGS. 1 and 3). Once the restraint is inserted to its midpoint, it is rotated ninety degrees to an employed position.

Figure 2:
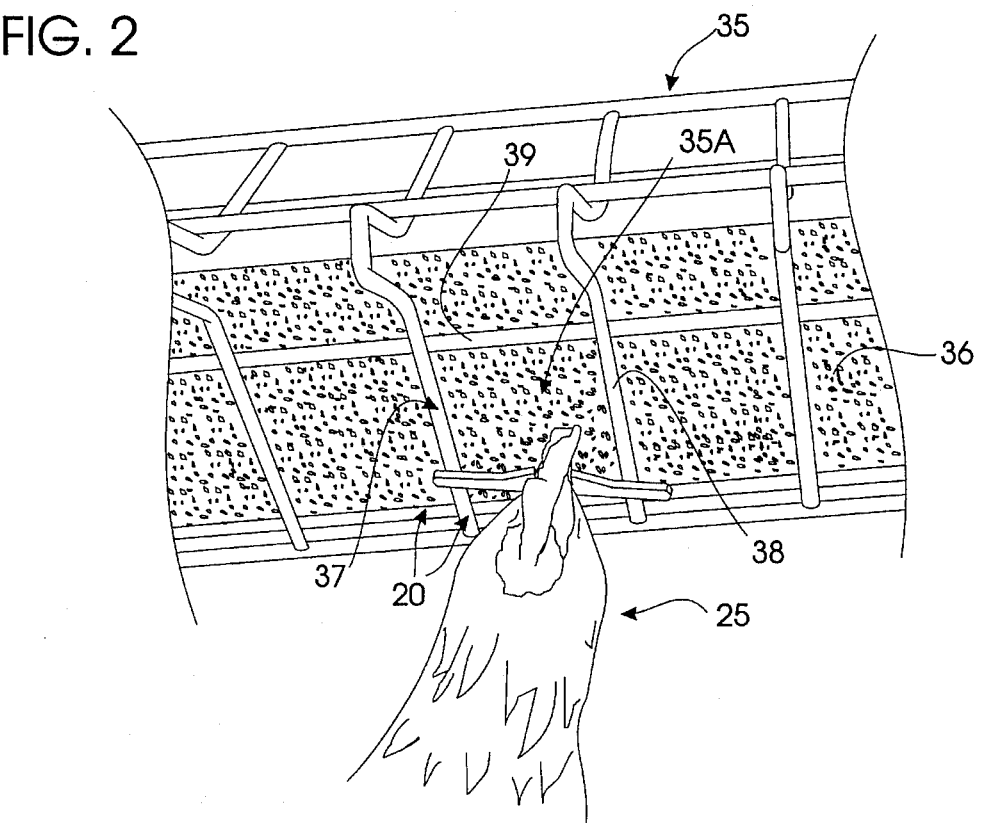
FIG. 2 is a environmental view showing the restraint used as a system for preventing a selected bird from eating from a feeder.

When employed, the restraint 20 prevents the bird 25 from gorging or overeating. As is best shown in FIG. 2, the restraint 20 prevents the bird 25 from eating from a feeder or trough 35 containing feed 36. The trough 35 is covered by a conventional guard grill 37. The guard grill 37 comprises a series of parallel, spaced apart stringers 39 perpendicularly intersected by a series of spaced apart stringers 38. The resulting access holes or gaps 35A permit the birds to remove feed 36 from the trough 35.

Generally, a bird sticks its beak 30 through the gap 35A to retrieve the feed 36. However a bird fitted with a restraint 20 cannot insert its beak 30 through the gap 35A. Thus, the bird 25 is prevented from eating from the trough 35.

The procedure for inserting the restraint into the selected bird 25 is simple. The restraint 20 is inserted through the nares 34 to its midpoint 50, reaching an inserted position. Then the restraint 20 is rotated ninety degrees to a deployed position (FIG. 3). In the deployed position, the restraint 20 prevents the bird from inserting its beak into a feeder through 35 (as shown in FIG. 2), thus controlling the eating habits of the bird.

The one-piece restraint 20 comprises an elongated body 40 having a solid, parallelepiped frame 42 and a pair of spaced apart, opposing ends 60 (shown best in FIGS. 4–8). The frame 42 has a top surface 44 and a spaced apart bottom surface 52.

The top frame surface 44 supports a pair of spaced apart, complimentary risers 46 forming ramps that are integral with frame 42. Each integral riser 46 begins inclining upwardly near an end 60 at an angle between five and forty-five degrees. Each riser 46 ends at an apex 49. A perpendicular wall or face 48 extends downwardly from each riser apex 49 to the top surface 44. The spaced apart walls or faces 48 are perpendicular to and border a flat surface juncture 54. A notch 70 is thus formed in the frame between faces 48.

The frame width 56 defined across the bottom surface 52 is less than the vertical riser height 58 from the riser apex 49 to the bottom surface 52 (FIGS. 6–7). This difference in dimensions facilitates sliding the restraint 20 into the beak of the bird. The subsequent rotation of the restraint 20 from the insertion position to the deployed position prevents the retraction of the restraint from the beak.

The opposing ends 60 facilitate the insertion of the restraint into the beak. Sloping bottom and top faces 62, 63 and side faces 64, 65 converge at tip 66. The convergent tip 66 facilitates insertion of the restraint 20 into the beak.

The juncture 54 between the risers 46 forms the bottom of the notch or channel 70. The channel 70 captures a beak portion 33 between the risers 46 when the restraint 20 is deployed. This captivation prevents the restraint 20 from sliding out of the beak 30 easily.

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A one-piece poultry feeding restraint comprising:

an elongated, resilient frame adapted to be disposed within the beak of a bird, said frame having a pair of spaced apart ends and a midpoint;

a pair of integral, spaced apart complimentary risers disposed upon said frame, each riser forming an inclined ramp rising from said ends; and, a recessed notch formed between said risers at said midpoint to comfortably dispose the restraint within the nares of said bird.

2. The poultry feed restraint as defined in claim 1 wherein said risers have perpendicular faces facing said notch for captivating said restraint in said beak.

3. The poultry feed restraint as defined in claim 2 wherein each of said ramps inclines upwardly from said frame at an angle of between five and forty-five degrees.

4. The poultry feed restraint as defined in claim 1 wherein the vertical riser height of said restraint is greater than the frame width of said restraint.

5. The poultry feed restraint as defined in claim 4 wherein said restraint is adapted to be inserted into said nares to an initial inserted position and subsequently rotated ninety degrees to an employed position.

6. A system for preventing unauthorized bird feeding or feed access comprising an elongated feed trough having a guard grill with a plurality of access openings having a predetermined width used in conjunction with a poultry feed restraint for selected birds seeking food through said grill, said restraint comprising:

one-piece frame means adapted to be disposed within the beak of a bird for preventing unauthorized feeding, said frame means having a pair of spaced apart ends;

riser means integral with said frame for captivating said beak to secure said restraint within the nares of said bird;

recessed notch means defined by said riser means for facilitating rotary movement of said restraint; and, wherein the length of said frame means exceeds the width of said access openings.

7. The poultry feed restraint as defined in claim 6 wherein said riser means has spaced-apart, perpendicular faces defining said notch means.

8. The poultry feed restraint as defined in claim 7 wherein said riser means inclines upwardly from said frame means at an angle of between five and forty-five degrees.

9. The poultry feed restraint as defined in claim 8 wherein the vertical riser height of said restraint is greater than the frame width of said restraint.

10. A system for preventing unauthorized bird feeding or feed access, said system comprising:

an elongated feed trough having a guard grill with a plurality of access openings having a predetermined width;

a poultry feed restraint for selected birds seeking food access through said grill, said restraint comprising:

an elongated, one-piece, resilient frame adapted to be disposed within the beak of a bird, said frame having a pair of spaced apart ends and a midpoint;

a pair of integral spaced apart, complimentary risers disposed upon said frame, each having an inclined ramp rising from said ends;

a recessed notch formed between said risers to comfortably dispose the restraint within the nares of said bird; and, wherein the length of said frame exceeds the width of said access openings.

11. The poultry feed restraint as defined in claim 10 wherein said risers have perpendicular faces facing said notch for captivating the restraint in said beak.

12. The poultry feed restraint as defined in claim 11 wherein each of said risers forms a ramp that inclines upwardly from said frame at an angle of between five and forty-five degrees.

13. The poultry feed restraint as defined in claim 12 wherein the vertical riser height of said restraint is greater than the frame width of said restraint.

14. The poultry feed restraint as defined in claim 13 wherein said restraint is adapted to be inserted into said nares to an initial temporary position and subsequently rotated ninety degrees to an employed, permanent position.

* * * * *